United States Patent [19]

Gomberg et al.

[11] 4,418,093
[45] Nov. 29, 1983

[54] METHOD FOR DISTRIBUTING MATERIAL INSIDE A TIRE CASING

[75] Inventors: Edward N. Gomberg, Hixon; James O. B. Wright, Chattanooga, both of Tenn.

[73] Assignee: Synair Corporation, Chattanooga, Tenn.

[21] Appl. No.: 362,342

[22] Filed: Mar. 26, 1982

[51] Int. Cl.³ .......................... B05D 7/22; B05D 7/02
[52] U.S. Cl. .......................................... 427/8; 118/53; 118/55; 152/347; 427/231; 427/240
[58] Field of Search .................. 427/231, 233, 240, 8; 118/53, 55, 56, 318; 156/115; 152/347

[56] References Cited

U.S. PATENT DOCUMENTS

| 1,231,222 | 6/1917 | Urbach | 118/318 |
| 2,935,109 | 5/1960 | Railsback | 156/115 X |
| 3,628,585 | 12/1971 | Pace | 524/173 X |
| 3,962,987 | 6/1976 | Brandl | 118/318 X |
| 4,115,172 | 9/1978 | Baboff et al. | 156/115 |
| 4,206,008 | 6/1980 | Tacke et al. | 152/347 X |
| 4,262,624 | 4/1981 | Soeda et al. | 427/233 X |

Primary Examiner—Edward C. Kimlin
Assistant Examiner—Thomas Bokan

[57] ABSTRACT

The present invention relates to a method and apparatus for producing a liner of elastomeric material insitu in a pneumatic tire casing.

5 Claims, 7 Drawing Figures

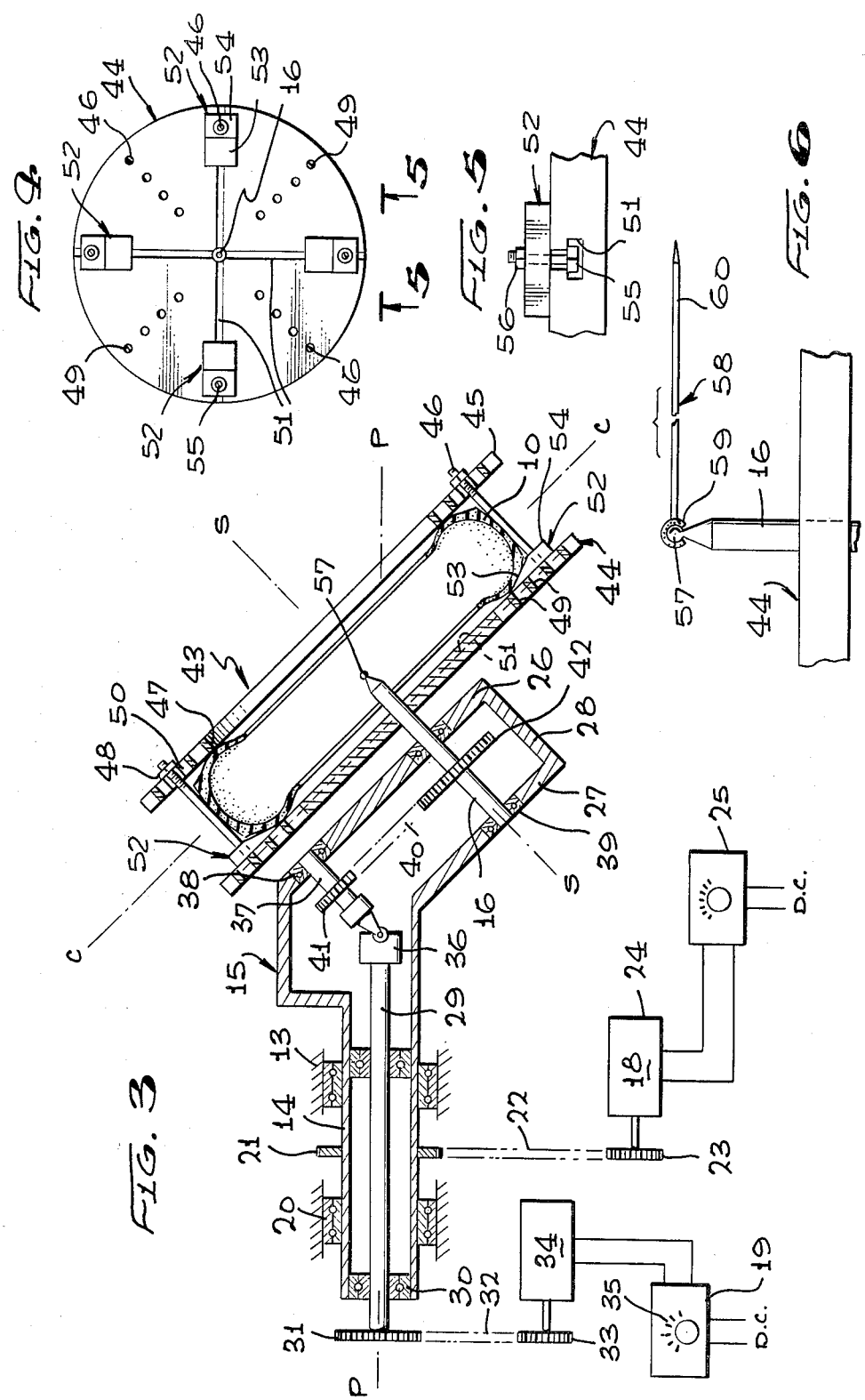

METHOD FOR DISTRIBUTING MATERIAL INSIDE A TIRE CASING

The present invention relates to an apparatus and method of producing a liner in an unmounted tire casing, and particularly to an apparatus and method which produces a liner of controlled thickness, contour and balance.

BACKGROUND OF THE INVENTION

The practice of putting material into the interior of tire casings is well known. The interior of tire casings have been sprayed so as to provide a lubricant and thereby reduce friction between the interior of the tire casing and an inner tube; have been sprayed to assist the curing of the interior portions of a tire casing; have been sprayed to introduce a sealent material about the interior of the tire casing so as to reduce the deflation of the tire when punctured by permitting the sealent material to flow to the puncture opening; and also, tires have been coated, as distinct from spraying, with material for the purpose of providing a sealent or even to increase the thickness of the tire so as to reduce the possibility of penetration into the interior of the tire by sharp objects.

Such procedures and the products produced thereby do not distribute the material within the tire casing evenly about the inner periphery of the tire so as to insure that the balance of the tire will not be modified by the material which is being added. This is not significant where a very thin coat of material is sprayed onto the interior of the tire but when the layer of material introduced into the tire is distributed so as to provide a thickness of material, as distinct from a mere coating of material, the problem of even distribution of the material becomes significant in maintaining the balance of the tire. In addition, there is the problem of distributing the material across the inner periphery of the tire casing and along contiguous sidewalls of the inner periphery to provide a layer or liner of material which is of substantially uniform thickness

PRIOR ART

U.S. Pat. No. 3,628,585 discloses a sealant material inside a tire casing. The sealant material is a polyurethane elastomer and it is painted about the interior of the tire casing. A pool of material is also provided and as the tire casing rotates, the material is distributed centrifugally about the inner periphery of the tire. U.S. Pat. Nos. 1,231,222 and 3,962,987 disclose techniques for spraying the interior of a tire casing whereby the tire casing is rotated about an axis and the material is introduced at one point. U.S. Pat. No. 1,231,222 discloses spraying a rubber solution which acts as an inner-tube lubricant and U.S. Pat. No. 3,962,987 discloses the spraying of a curing agent on the interior of a green tire casing. Both of these latter examples of the prior art disclose the disposition of a coating on the interior of the tire casing which has no material thickness. U.S. Pat. Nos. 4,115,172 and 4,206,008 disclose techniques of introducing a sealant material into the interior of a tire casing. In both of these examples, an unmounted tire casing is rotated and the material is introduced at a single point. In both of these examples, the material is introduced to provide a layer of material of a thickness greater than a coating or film.

SUMMARY OF THE INVENTION

In contrast to the teachings in the prior art, the present invention provides an apparatus and method of introducing into the interior of the tire casing, material which is distributed evenly about the interior periphery of the tire casing so as to avoid any problems of imbalance of the tire casing, and also to spread the material evenly across the interior periphery and contiguous sidewalls of the tire casing. Applicants achieve this result by rotation of the tire casing in a manner which is unique. In those examples of the prior art where a tire casing was rotated so as to distribute the material, the tire was invariably rotated at a sufficiently high speed so as to distribute the material centrifugally. When the material is distributed centrifugally, the resultant material section is a segment of a circle with its chord parallel to the wheel axis. This creates a pinch point problem if innertubes would be used and whether it is a tubeless or a tube tire casing, requires a thick section in the middle of the tire casing in order to get as wide a coverage as possible protecting the inside surface of the tire casing in proportion to that outside surface of the tire casing contacting the road.

In the practice of the invention, an unmounted tire casing would be positioned in a machine capable of rotating the tire at sufficient speed so as to distribute material placed in the interior of the tire casing about the inner periphery of the tire casing. The machine is also capable of oscillating the tire casing so as to spread the material axially or toward the interior surfaces of the sidewalls of the tire casing. The tire casing is initially rotated at speeds sufficient so that an uncured liquid elastomeric material introduced into the tire casing will be distributed evenly about the inner periphery of the tire casing. After the material is peripherally distributed in an even manner but before the material has started to substantially cure, the tire casing is oscillated about another axis so as to allow the material to be distributed axially within the tire casing. The tire casing continues to rotate about the two axis until the material is cured to a point where it is no longer flowable. The result is a layer of material of substantially uniform thickness across the inner periphery of the tire casing and adjacent contiguous sidewalls.

The invention will be best understood from the following description of the accompanying drawings.

IN THE ACCOMPANYING DRAWINGS

FIG. 1A discloses a cross-section of a tire casing with a liner shown therein produced by prior art centrifugal distribution techniques.

FIG. 3 is a schematic drawing of the apparatus of FIG. 2 showing the details of construction.

FIG. 4 shows details of the tire casing mounting plates and mechanism for centering the tire casing on the mounting plates.

FIG. 5 is a detail taken along line 5—5 of FIG. 4 and showing a detail of the device used to locate the tire casing axially along one of the axes of rotation.

FIG. 6 shows a device used to locate the center plane of the tire casing relative to a point along one of the axis of rotation of the tire casing in the machine.

DESCRIPTION OF A PREFERRED EMBODIMENT

Figure 1A:
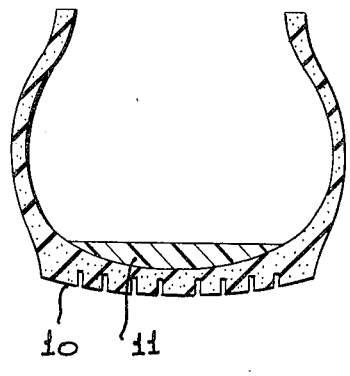
FIG. 1B is a cross section of a tire casing showing the distribution of a liner produced in accordance with the teaching of the present invention.

Referring now to FIG. 1A the tire casing 10 shows a liner 11 of material which is solid and distributed about the inner periphery of the tire casing. It is noted that the inner surface of the liner is a chord parallel to the axis of rotation of the tire casing. This liner is distributed centrifically before it becomes solid and the distribution is by centrifical force under conventional methods. As a result of the straight line inner surface of the liner, material does not extend up contiguous sidewalls of the inner surface of the tire casing. Thus, if protection is desired in the area of the contiguous sidewall, the liner 11 would have to be thickened adding materially to the weight of the tire.

Figure 1B:
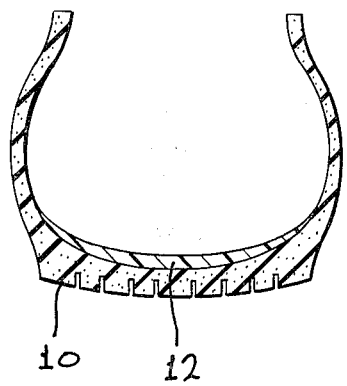

In contrast thereto, FIG. 1B discloes a tire casing 10 with a liner of material about the inner periphery where the thickness of the liner is substantially uniform and then tapers to an edge as the liner extends away from the inner periphery of the tire up along the contiguous adjacent inner sidewalls of the tire casing. It is thus evident that the liner 12 provides more protection along the contiguous adjacent inner sidewalls of the casing without materially increasing the mass or weight of the material on the inner surface of the tire casing.

Figure 2:
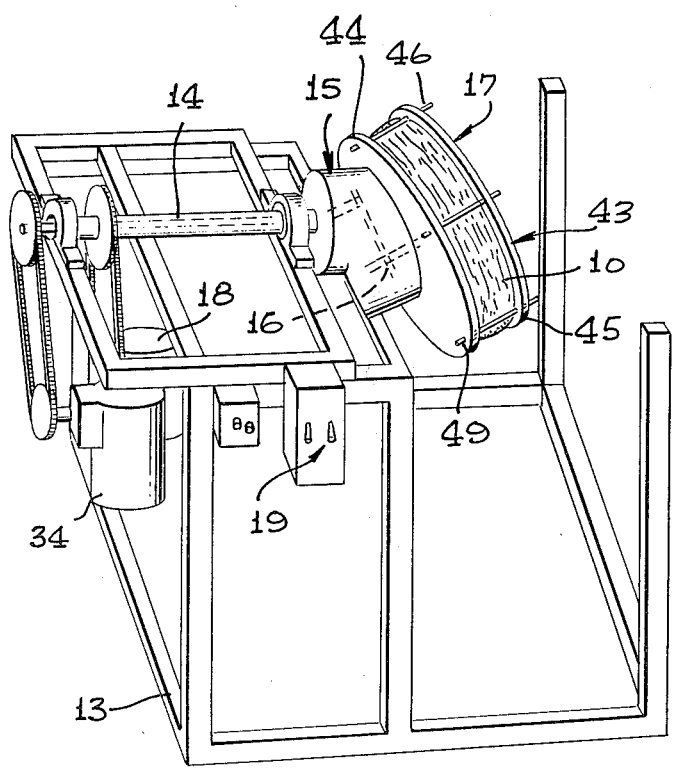
FIG. 2 is a perspective view of an exemplary apparatus capable of producing a solid uniform liner in the interior of a tire casing as shown in FIG. 1B.

A machine capable of practicing the invention is shown in FIG. 2. The machine includes a frame or base 13 upon which is rotatably mounted a shaft 14 having a member 15 rotatably secured at one end of the shaft 14. The member 15 mounts a second rotatable shaft 16 which has at an end a tire casing mounting means generally indicated at 17 which rotatably carries a tire casing 10. A power source generally indicated at 18 and rotational speed controls generally indicated at 19 for the shaft 14 are carried by the base 13.

In FIG. 3 the apparatus of FIG. 2 is schematically outlined in greater detail. The shaft 14 is a hollow shaft and rotatably mounted by bearings 20 on the base 13. The shaft 14 carries a sprocket gear 21 which is connected by a chain 22 to a sprocket 23 mounted on the drive shaft of one power source 18 which is a D.C. electric motor 24. The amount of current supplied to the armature of the motor 24 is controlled by a variable potentiometer 25. Thus, by varying the current supplied to the armature the motor 24, the speed of rotation of the shaft 14 can be varied and controlled.

At the right hand end of the shaft 14 the member 15 is secured, such as by welding or any other suitable means of connection, so that the member 15 rotates as a unit with the shaft 14. The member 15 comprises a housing having spaced walls 26,27 which preferably are parallel to each other, together with an end wall 28. The exact configuration of the member 15 is not important so long as the member would be capable of mounting a spin axis shaft 16 in the manner to be described hereandafter.

Coaxially and rotatably mounted within the shaft 14 is a drive shaft 29. The drive shaft 29 is supported rotatably within the interior of shaft 14 by axially spaced bearings 30. At the left hand end of drive shaft 29 is a sprocket gear 31 having entrained thereover a chain 32 which engages a sprocket 33 on the drive shaft of another D.C. motor 34 connected to another variable potentiometer 35 similar in purpose and effect to the arrangement of the D.C. motor 24 and the control by potentiometer 25 for controlling the rotational speed of shaft 14. Thus, it is apparent that the drive shaft 29 can be rotated at speeds which are variable and independent of the variable speeds at which shaft 14 is rotated.

At the right hand end of drive shaft 29 a universal coupling 36 is provided. The other end of the universal coupling 36 is connected to a stub shaft 37 mounted rotatably in the wall 26 of member 15 by a bearing 38.

Spaced from, but parallel to the axis of rotation of stub shaft 37, is the spin axis shaft 16. Spin axis shaft 16 is rotatably mounted in the walls 26 and 27 of the member 15 by bearings 39. The stub shaft 37 and the spin axis shaft 16 are constrained to rotate together by means of a chain 40 entrained about sprockets 41 and 42 respectively secured to the stub shaft 37 and the spin axis shaft 16.

Thus, motor 34 rotates the drive shaft 29 through the chain 32. By means of the universal coupling 36 the drive shaft 29 rotates the stub shaft 37 at the same speed. By the connection of the chain 40 between the stub shaft and the spin axis shaft 16, the spin axis shaft rotates from the drive of the motor 34 at a speed controlled by the potentiometer 35. In contrast, motor 24 drives the chain 22 and rotates the shaft 14 and also the member 15 fixed thereto, and mounting the spin axis shaft 16, at a speed independent of the speed at which the spin axis shaft 16 is being driven by the motor 34.

The apparatus is arranged so that the shaft 14 and the drive shaft 29 are concentric and both rotate about the same axis P—P.

Because of the positioning of the walls 26,27 of the member 15 at an angle to the axis P—P, and the fact that the stub shaft 37 and the spin axis shaft 16 are mounted for rotation in member 15 about axes at right angles to the walls 26,27, necessarily the spin axis shaft 16 rotates about an axis S—S which is at an angle and intersects the axis P—P.

It has been found that in the practice of the invention it is important that the intersection of the axis P—P and the axis S—S be at a point which is located within the interior periphery of the tire casing and preferably the point of intersection should be contained in the central plain C—C of a tire casing mounted on the apparatus.

Secured to the portion of the spin axis shaft 16 projecting from the member 15 is a tire casing mounting apparatus generally indicated at 43. Preferably, the mounting apparatus consists of spaced apart plates 44,45 interconnected by a plurality of threaded members 46 positioned circumferentially about the plates 44,45. The inner plate 44 is preferably a solid plate except for threaded openings therein which will be described hereandafter. The outer plate 45 is provided with a central opening 47 so as to provide access to the interior of the tire casing. As is evident from FIG. 3, the tire casing is secured between plates 44 and 45 by means of the interconnecting threaded members 46 and secured in that position by the means of nuts 48 threaded upon the members 46.

Referring now to FIG. 4, there is shown in greater detail the base plate 44 fixedly mounted on the spin axis shaft 16. Extending radially from the spin axis shaft 16 are at least four series of threaded openings 49. Four such radiating sets of threaded openings are shown. This is the preferred arrangement for purposes of symmetry. The radiating lines of openings 49 are arranged so that there are a set of four such threaded openings at different circumferences. The radial distance of each circumferential set of threaded openings from the spin axis shaft 16 is based upon the outside diameter of standard tire casings. Assuming a tire casing with an outside diameter equivalent to the distance between the outermost threaded openings as they are diametrically opposed, and inserting the threaded members 46 into the four threaded openings corresponding to the outside diameter of the tire casing, it is apparent that the threaded members 46 are adapted to hold the tire casing centrally about the spin axis 16. Once the tire casing has been so located, then the outer plate 45 can be positioned over the threaded members 46 through openings 50 in the outer plate which correspond radially and circumferentially to the openings 45 in the inner plate 44.

In addition to the radiating lines of threaded openings 49 in plate 44, there are provided T-grooves 51 radiating from the spin axis shaft 16 and preferably the T-grooves are equally spaced between the radially extending lines of threaded openings 49. Mounted in each T-groove 51 is a wedge member 52 which is adapted to slide along each T-groove and can be selectively and fixedly secured in position. Each wedge includes a flat bottom surface engaging the surface of the plate 44. The opposite side of the wedge includes a sloped surface 53 projecting toward the spin axis shaft 16 and a flat upper surface 54.

To enable the wedge members 52 to be selectively positioned along the T-grooves 51 and yet to be locked in place, attention is directed to FIG. 5. Extending through the flat surface 54 of the wedge is a cap screw 55 where the head of the cap screw runs in the T-groove 51. The threaded end of the cap screw extends through the upper surface 54 of the wedge 52 and a nut 56 is threaded on this extended portion of the cap screw.

It can thus be seen that the wedges 52 can be moved radially along the T-grooves and selectively secured in any position radially from the spin axis shaft 16 by means of tightening down on the nuts 56.

The purpose of the wedges 52 and their selective positioning is to enable selective movement of the tire casing 10 axially along the spin axis S—S. As shown in FIG. 3, the wedges 52 engage the exterior sidewall of the tire casing and as all of the wedges are selectively moved toward the spin axis shaft 16, they move the tire casing axially outwardly along the spin axis S—S. This enables the central plane C—C of the tire casing to be moved relative to the point of intersection of the axis P—P and S—S. When the center plane C—C of the tire casing is located in the preferred position relative to the point of intersection of the axis P—P and S—S, the nuts 48 are threaded down on the threaded members 46 as they project from the outer plate 45 and thus snuggly secures the tire casing in a position so that it will rotate both about axis P—P and axis S—S.

In order to insure that the center plane C—C of the tire casing 10 is located in the position desired relative to the intersection of the axis P—P and S—S, a centering device is provided as shown in FIG. 6. At the end of spin axis shaft 16 there is provided a spherical member 57. The length of the projection of the spin axis shaft and the positioning of the spherical member 57 at the end thereof are dimensioned such that the center of the spherical member 57 is at the point of intersection of the axis P—P and S—S. Adapted to be mounted on the spherical member is an indicator 58 consisting of a cup portion 59 made of a resiliant material and adapted to be snapped over the spherical member 57. The indicator includes a pointer 60 extending from the portion 59 a distance equivalent to the approximate radius of the interior of a tire casing which is mounted on the plate 44. The center of the tire casing axially can be measured by conventional means and when the end of the indicator 60 points to that center location of the interior periphery axially of the tire casing, the center plane C—C of the tire casing should pass through the point of intersection of the axis P—P and S—S which is also in the center of the spherical member 57.

OPERATION

In the operation of the apparatus in order to provide a liner of substantially uniform thickness across the inner periphery of a tire casing, an uncured liquid material capable of curing into an elastomer is prepared. The material preferably should have a good bonding characteristic with the interior surface of the tire casing. If desired, the tire casing can be initially prepared by having an application of an adhesive sprayed about the inner periphery to facilitate the bonding with the subsequently to be applied liquid material.

The tire casing 10 is mounted between the plates 44 and 45 so that it is radially centered about the spin axis S—S. Preferably, the tire casing 10 is located axially along the spin axis S—S so that the central plane C—C of the tire casing passes through the spherical member 57 at the end of the spin axis shaft 16 which is the point of intersection of the axis P—P and S—S.

Once the tire casing is snuggly secured in the desired position, the member 15 is rotated so that the tire casing and the mounting apparatus therefore is in a substantially vertical position. While it is in this position, motor 34 is activated so as to rotate the drive shaft 29 which in turn, through the universal coupling 36, and chain 40, rotates the spin axis shaft 16 which in turn rotates the tire casing 10 mounted between the plates 44 and 45. As the tire casing 10 rotates in a substantially vertical plane, the liquid material is introduced into the interior of the tire. In the apparatus shown, the material can be introduced by hand although if desired a dispensing mechanism could be provided whereby a nozzle could be introduced into the interior of the rotating tire casing and deposit the material therein. Due to the oscillating motion to which the tire casing 10 will be subsequently subjected, any mechanism for introducing the material into the interior of the tire casing must be removable a reasonable distance so as to avoid interference with the oscillating motion of the tire casing.

The speed of rotation of the tire casing about the spin axis 16 is controlled by adjusting the armature current in the motor 34 by adjustment of the potentiometer 35. The speed of rotation of the tire casing 10 about the spin axis S—S must be such so as to insure that the material will flow evenly about the inner periphery of the tire casing. The speed must be such so that the material will not drip under the action of gravity as the tire rotates. As a practical matter, the operator can easily observe, after the material has been introduced into the tire and the tire is rotating whether there is any dripping of the material under the action of gravity while the tire rotates. If there is such dripping, the speed of rotation is increased. If the material does not flow evenly about the inner periphery of the tire due to the fact that the material is very viscous, then the speed of rotation should be reduced so as to permit the material to move or flow about the interior of the tire casing.

Once the material has been distributed peripherally about the inner surface of the tire casing, the motor 24 is activated under the control of the potentiometer 25. Motor 24, through chain 22, rotates the shaft 14 and thus the member 15 which mounts the spin axis shaft. Consequently, there is now created simultaneous rotation of the tire casing about axis P—P and also axis S—S. Rotation about the axis S—S insures the circumferential distribution of the material. Rotation about the axis P—P insures that the tire casing 10 is subjected to an oscillating action inducing axial forces upon the material within the inner periphery of the tire and causing such material to flow axially of the tire casing and up the contiguous adjacent interior sidewalls of the tire.

Rotation about both axis is continued until the liquid material has cured to a point of non-flowability. At that point, the tire casing can be removed from the mounting apparatus 17 and permitted to cure completely separate from the apparatus disclosed.

The following are two examples of operation of the apparatus and practice of the method of the present invention.

EXAMPLE I

A G.78-15 tire is chucked into the machine and rotation of the spin axis was set at 100 rpm. Five pounds of freshly mixed urethane elastomer is dispensed into the tire. Even distribution of material around the perimeter of the tire was achieved in 5 seconds. The second axis was rotated at 80 rpm and then the spin axis rotation slowed to 38 rpm. After 15 minutes the urethane was cured and both motors were stopped. On removal of the tire from the machine, the tire was sectioned and measured. It was found that the bottom quarter of the tire was coated with a uniform layer of liner elastomer $\frac{1}{4}''$ thick.

EXAMPLE II

A 10.00-22 tire was primed by applying a cyanoacrylate adhesive and a thin layer of liner material to the inside of the casing (applied before the adhesive dried). The tire was chucked into the machine and the tire was rotated at 80 rpm with the axis of rotation horizontal. Ten pounds of freshly mixed urethane elastomer was poured into the spinning tire. After 20 seconds, the material was distributed evenly around the perimeter of the tire casing. Rotation of the second axis was then begun at 60 rpm imposing a 30° precessional motion of the spin axis 60 times per minute. The spin rate was decreased to 7 rpm. After 20 minutes the material had cured and the machine was stopped. The tire was removed from the machine and a section was cut and measured. It was found that the material was evenly distributed over $\frac{1}{4}$ of the inside surface of the tire in a layer $\frac{1}{4}$ inch thick only feathering out in the last $\frac{1}{2}$ inch. Many tires were primed and lined as described above and road tested. The tires could be driven over boards with nails or, nails could be driven into the tires and the tires could be driven fully loaded and at highway speeds without loss of air.

When introducing the liquid polyurethane material into the interior of the tire casing, it has been found that a certain portion of that material should be retained as a sample. During the oscillating motion of the tire casing, this sample can be moved so that the material can be observed to determine the degree of cure that has taken place. Because the material on the interior of the tire and the sample are identical and under the same ambient conditions, the rate of cure of the sample should be identical to the rate of cure of the material in the interior of the tire casing. Thus, when the sample becomes non-flowable, the material in the interior of the tire casing should be in the same condition and this can determine the point at which the tire casing can be removed from the apparatus and stored for complete curing without any distortion of the disposition of the liner on the interior of the tire casing.

There are occasions when it is desired that the liner rise higher up one interior side wall of the tire than the other. To achieve this result, the center plane C—C of the tire casing is located to intersect the spin axis S—S axially spaced from the intersection of the intersection of the axes P—P and S—S.

We claim:

1. A method of producing an elastomeric liner insitu within a pneumatic tire casing comprising the steps of:
    (a) mounting a tire casing for rotation about a spin axis;
    (b) introducing a liquid mixture of material adapted to cure to an elastomer into the interior of said tire casing;
    (c) rotating said tire casing about spin axis at a first speed to distribute said material about the interior periphery of said tire casing;
    (d) rotating said tire casing about a second axis before said material has polymerized, said second axis being at an angle to and intersecting said spin axis at a fixed point whereby said tire casing oscillates and causes said umpolymerized material to spread across the bottom and contiguous portions of the sidewalls of the inner periphery of the tire casing; and
    (e) continuing said oscillating movement of said tire casing until said material is polymerized to the point of non-flowability.

2. The method of claim 1, wherein said second axis intersects said spin axis at said point which is within the center plane of said tire casing.

3. The method of claim 1, wherein said tire casing is rotated about said spin axis at said first speed independent of the speed of rotation of said tire casing about said second axis.

4. The method of claim 1, wherein said liquid mixture of material is introduced into said tire casing while said casing is rotating about said spin axis at said first speed, retaining a sample portion of said material outside said casing to measure the rate of polymerization, and stopping all said rotation when said sample portion of material becomes non-flowable.

5. The method of claim 1, wherein the oscillating and spin speeds are adjusted to bring about the desired liner contours.

* * * * *